No. 896,894. PATENTED AUG. 25, 1908.
P. CLIFFORD.
CUSHIONED HORSESHOE.
APPLICATION FILED OCT. 11, 1907.
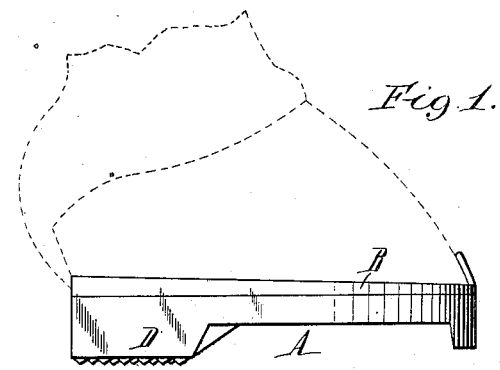
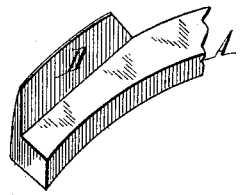
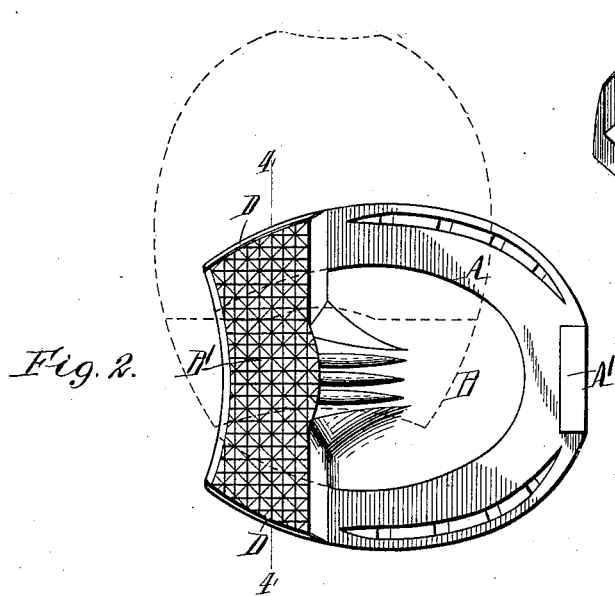
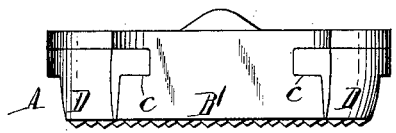
Witnesses:
Gustav W. Hora.
Richard Sommer.
Patrick Clifford, Inventor
by Geyer & Popp
Attorneys.

UNITED STATES PATENT OFFICE.

PATRICK CLIFFORD, OF BUFFALO, NEW YORK, ASSIGNOR OF ONE-HALF TO DENNIS J. CORBETT, OF BUFFALO, NEW YORK.

CUSHIONED HORSESHOE.

No. 896,894.  Specification of Letters Patent.  Patented Aug. 25, 1908.

Application filed October 11, 1907. Serial No. 396,916.

*To all whom it may concern:*

Be it known that I, PATRICK CLIFFORD, a citizen of the United States, residing at Buffalo, in the county of Erie and State of New York, have invented a new and useful Improvement in Cushioned Horseshoes, of which the following is a specification.

This invention relates to that class of horseshoes having elastic pads or cushions for relieving the hoof from shock and preventing the animal from slipping. A pad of this character is shown and described in Letters Patent of the United States No. 803,211 granted October 31, 1905 to Dennis J. Corbett and myself. The pad of that patent consists of a rubber plate interposed between the hoof and the iron horseshoe and a heel or heel-plate provided in its sides with recesses which receive the heel-portions of the horseshoe. It has been found in practice that when the heel of the pad receives an unusually severe blow, the portions below the recesses are liable to be split or torn off.

The object of my invention is to provide the horseshoe with simple and inexpensive means for protecting the heel of the pad and keeping its ends intact.

In the accompanying drawings: Figure 1 is a side elevation of the improved horseshoe. Fig. 2 is a bottom plan view thereof. Fig. 3 is a rear view of the same. Fig. 4 is a transverse section in line 4—4, Fig. 2. Fig. 5 is a fragmentary perspective view of the horse shoe.

Similar letters of reference indicate corresponding parts throughout the several views.

A indicates the iron horseshoe provided with a toe calk $A^1$ of any suitable construction.

The pad or cushion is preferably constructed of soft rubber reinforced by canvas and comprises a body or main plate B and an integral heel or heel-plate $B^1$ arranged on the underside of its rear portion and extending practically from side to side thereof. As shown, the tread-face of the heel is cross-grooved, ribbed or otherwise roughened to prevent slipping. The main plate B is interposed between the upper side of the horseshoe and the animal's hoof, and in its preferred form it closely follows the contour of the shoe and completely covers the same.

As shown in the drawings, the heel $B^1$ of the pad extends nearly to the outer edges of the heel-portions of the horseshoe and is provided in its ends with horizontal grooves or recesses $c$ which receive the heel portions of the shoe. The pad is removable from the shoe so that it can be renewed when necessary, and for this purpose the width or small dimension of the heel $B^1$ is less than that of the central opening of the shoe, so that upon turning the pad at right angles to the shoe, as shown by dotted lines in Fig. 2, the heel is released from the heel portions of the shoe. By a reverse action the pad is interlocked with the shoe.

At the outer edges of its heel-portions the shoe is provided with depending lugs, guards or shields D which cover the ends of the elastic heel $B^1$, thus protecting the same from destructive blows and preventing splitting and ultimate breaking off of the end portions of the heel which form the bottoms of the recesses $c$. The guards D preferably extend from front to rear of the heel $B^1$ and their lower edges are substantially flush with the face of the latter. In addition to the function of protecting the rubber heel, the guards also serve as heel-calks and may be either dull or sharp, as required. As the guards thus practically take the place of the ordinary heel-calks, the desired protection of the rubber heel or pad is obtained without increasing the cost of the horseshoe. This improved construction, while protecting the ends or lateral portions of the rubber-heel, employs no parts on the horseshoe which in any way interfere with the turning movement of the pad necessary to interlock it with the horseshoe and disengage it therefrom.

I claim as my invention:

1. The combination of a pad or cushion comprising a body-plate having a heel extending across the underside of its rear portion, and a horseshoe provided with depending guards which cover the lateral portions of said heel, said heel having means for detachably interlocking it with the heel-portions of the horseshoe and the pad being rotatable on the horse shoe for engaging and disengaging its heel therefrom, substantially as set forth.

2. The combination of a pad or cushion comprising a body-plate having a depending heel extending across the underside of its rear portion, said heel being provided in its lateral portions with recesses, and a horseshoe having its heel-portions detachably interlocked with said recesses and provided with depending guards which cover the lateral portions of said heel, said body-plate resting upon the horseshoe and being rotatable thereon, and the axial dimension of the heel of the pad being less than the width of the shoe-opening, whereby upon turning the pad substantially at right angles to the horseshoe, its recesses are disengaged from the heel-portions of the horseshoe, substantially as set forth.

Witness my hand this 9th day of October, 1907.

PATRICK CLIFFORD.

Witnesses:
  C. F. GEYER,
  ANNA HEIGIS.